Oct. 28, 1969     S. O. PERSSON     3,474,841
CLAMPING DEVICE FOR USE WITH CARPENTERS' BENCHES AND THE LIKE
Filed May 10, 1967     3 Sheets-Sheet 1

INVENTOR
Sven Olof Persson

BY Karl W. Flocks
ATTORNEY

INVENTOR
Sven Olof Persson

BY Karl W. Flocks

ATTORNEY

Oct. 28, 1969     S. O. PERSSON     3,474,841
CLAMPING DEVICE FOR USE WITH CARPENTERS' BENCHES AND THE LIKE
Filed May 10, 1967     3 Sheets-Sheet 3

INVENTOR
Sven Olof Persson

BY   Karl W. Flocks

ATTORNEY

United States Patent Office 3,474,841
Patented Oct. 28, 1969

3,474,841
CLAMPING DEVICE FOR USE WITH
CARPENTERS' BENCHES AND THE LIKE
Sven Olof Persson, Fredmansgrand 6,
Torshalla, Sweden
Filed May 10, 1967, Ser. No. 637,395
Claims priority, application Sweden, May 10, 1966,
6,385/66
Int. Cl. B25b 5/02, 5/10
U.S. Cl. 144—306                4 Claims

ABSTRACT OF THE DISCLOSURE

A workpiece clamping device having a mounting plate countersunk in the bench to lie flush with the bench surface, an elongate opening in said plate with a widened portion at one end, a clamping screw mounted beneath said mounting plate, a member upstanding through said opening and operable by said clamping screw to serve as an abutment for one end of the workpiece to be clamped. Continued rotation of the clamping screw will move the abutment member into the widened portion of the opening, thereby permitting said member to swing laterally aside to a recumbent position parallel or coplanar with the bench surface, in which position the latter is entirely free from any upstanding parts of said abutment member.

---

Prior-art clamping devices of this type generally comprise a plate preferably countersunk in the bench to lie flush with the bench surface, and bearings disposed at the underside of the plate for receiving a rotary but axially immovable clamping screw also located beneath the plate and having its threaded portion situated between said bearings and adapted to cooperate with mating threads of a member having a portion upstanding through an elongate opening provided in the plate and extending along said clamping screw, said portion serving as an abutment for one end of a workpiece, and the edges of the elongate opening or slot are intended to engage the lateral surfaces of the member to guide said member laterally, when moved by means of said screw.

The principal characteristic features of the clamping device of the invention reside in that the elongate opening or slot at one end and at least on one side has a widened portion and that the member guided by said opening or slot and arranged to engage the workpiece is adapted upon its arrival at said widened portion to be moved laterally aside, when the lateral guiding effect provided by the slot edges ceases, to a position in which one side face of said member is parallel or coplanar with the upper side of the plate lying flush with the bench surface.

These and further features of the invention will become apparent from the following description in which reference is made to the accompanying drawings illustrating an embodiment, chosen by way of example, of the clamping device. In the drawings.

Figure 1:
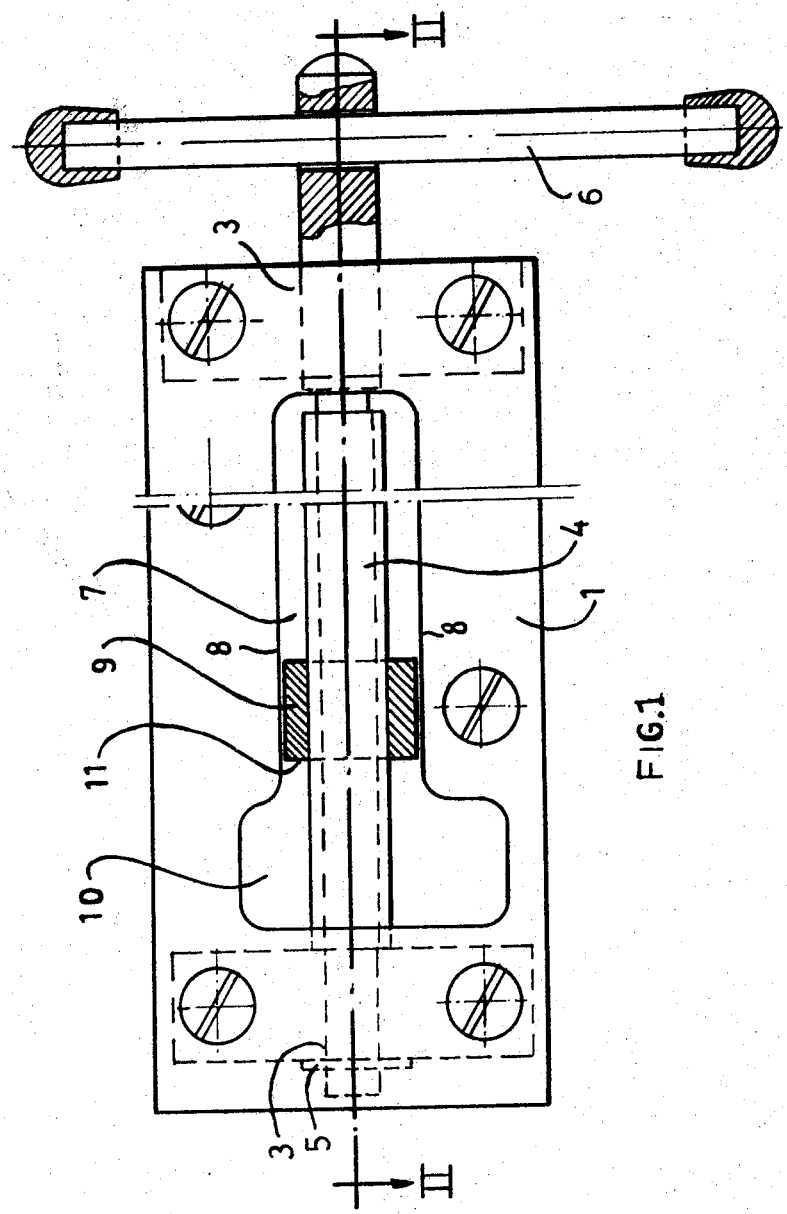
FIGURE 1 is a top plan view of a clamping device constructed as a carpenter's bench fitting.

The plate 1 of the clamping device is countersunk in the upper surface 2 of the carpenter's bench. A bearing 3 for the clamping screw 4 is disposed at either end of the plate at the underside thereof. The clamping screw is mounted for rotation in its bearings but is axially immovable therein, and at the end inwardly of the inner bearing the screw has associated with it a locking washer 5 preventing axial movements of the screw. A handle 6 with which to rotate the screw is mounted at the end thereof projecting outside the plate 1. An elongate opening or slot 7 is provided in the plate 1 and the edges 8 of said slot serve to guide the side faces of the member 9 screwed onto the clamping screw and having an abutment portion at each end. The abutment portion upstanding through the slot is adapted to engage one end of a workpiece (not shown). The slot 7 extends along substantially the entire threaded portion of the clamping screw 4 and at its inner end has a transverse widened portion 10 the width of which conforms to the total height of the member 9 movable along the slot by rotation of the screw 4. As the member 9 by rotation of the screw 4 approaches and enters the widened portion 10 of the slot, the member will cease to be laterally guided, and the continued rotation of the screw will swing the member 9 into recumbent position shown in FIGURE 5. As a consequence, the surface of the carpenter's bench will be entirely free from upstanding portions.

Figure 3:
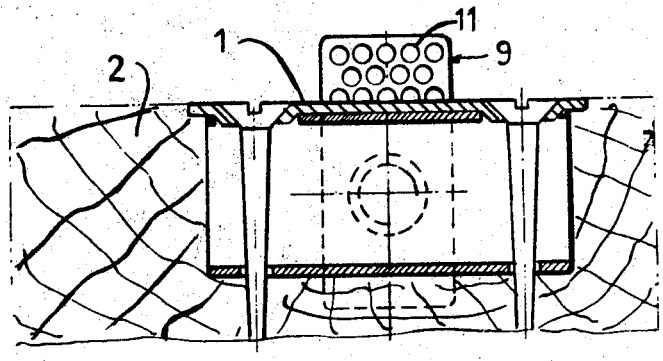
FIGURE 3 is a section of the fitting on line III—III in FIGUIE 2.
Figure 4:
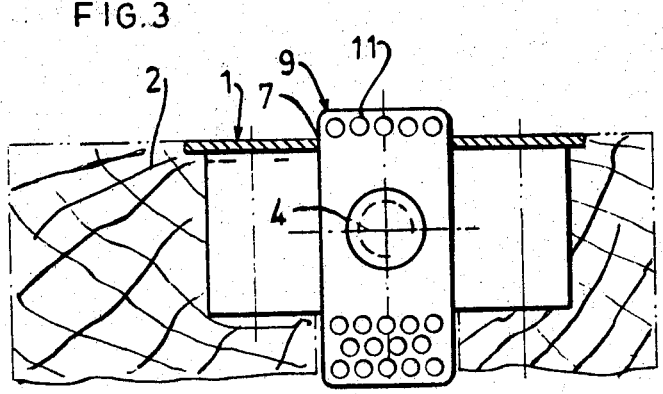
FIGURE 4 is a section of the fitting on line IV—IV in FIGURE 2, but with the member having the abutment portion rotated through 180°.
Figure 5:
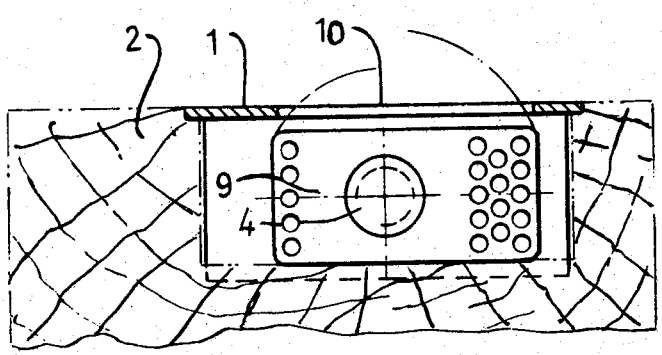
FIGURE 5 is a section of the fitting on line V—V in FIGURE 2, with said member swung downwardly into the position in which it lies beneath the surface of the plate of the clamping device.

As will appear most clearly from FIGURES 3 to 5 the internally threaded bore 9' of the member 9, through which the screw 4 extends, is located closer to one end portion of the member than the other, and at both ends the member is equipped with means 11 such as knurls or serrations for an improved engagement with the workpiece. By reason of the eccentric position of the screw 4 relative to the member 9 the latter can be rotated through 180° to provide either a low or a high abutment portion. To conform to the eccentricity of the member 9 the said transverse widened portion 10 at one end of the slot 7 is of greater extension on one side of said slot.

Figure 2:
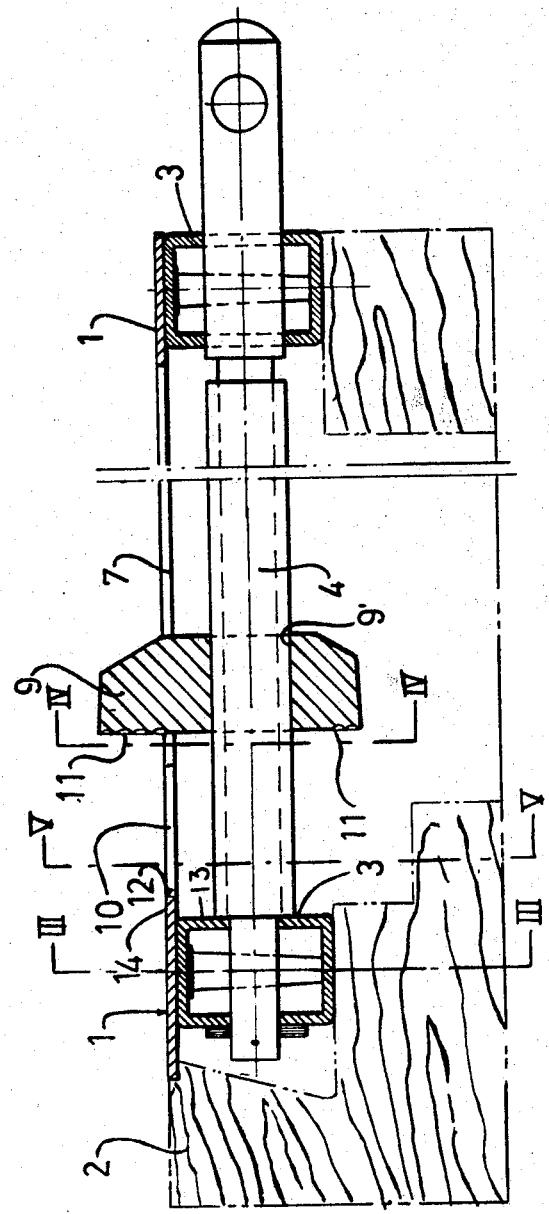
FIGURE 2 is a section of the fitting on line II—II in FIGURE 1.

As will appear from FIGURES 1 and 2, the transverse extreme edge 12 of the widened portion, remote from the slot 7, is slightly spaced from that end surface 13 of the adjacent bearing, which faces the middle portion of the clamping screw. The portion 14 of the plate between said bearing 13 and said extreme edge 12 has for its object to lock the member 9 by further rotation of the screw after the member has entered the widened portion and has been swung laterally aside. The front edge of that side face of the member which is then facing upwardly will be moved in under the portion 14 of the plate and be locked by reason of the interengagement of the underside of said plate portion and said side face.

In a modification (not shown) the clamping device does not possess this possibility of locking the member 9. In such modification the member instead has a width, counted between its parallel side faces that engage the slot edges, which is twice the distance from the center of the screw to the upper surface of the plate. In the recumbent position of the member the upwardly facing side face thereof will then lie flush with the upper side of the plate.

While a preferred embodiment of the invention has been described above and shown in the drawings, it will readily be realized by those skilled in the art that the invention can be modified in several ways within the scope of the appended claims.

What I claim and desire to secure by Letters Patent is:

1. A clamping device preferably for use with carpenters' benches and the like, comprising a plate having an elongate opening and bearings disposed at the underside of said plate at each end of said opening, a screw member with journaled end portions, which portions cooperate with said bearings to permit rotation of said screw member and prevent axial movement of the same, a clamping member threaded onto said screw member at the threaded portion thereof between said bearings and arranged upon turning of said screw member to travel along the elongate opening of said plate guided by the edges of said opening, the edges of the opening engaging lateral surfaces of said clamping member, wherein the elongate clamping member guiding opening at one of its ends and on at least one side has a widened portion which is arranged upon arrival of said clamping member there to permit turning of said clamping member, around the axis of said screw member when the lateral guiding effect of the edge thus ceases, to a position in which one side face of said clamping member is parallel or coplanar with the upper side of said plate that is lying substantially flush with the bench surface.

2. A clamping device in accordance with claim 1, wherein the height of said clamping member, movable upon rotating of said screw member, is greater than the width of the clamping member, counted between the side faces that are to engage the edges of the opening, and the threaded opening for said screw member of the clamping member is situated midway between said side faces but closer to one end portion of said clamping member than the other end portion thereof.

3. A clamping device in accordance with claim 2, wherein a widened portion of the elongate opening is arranged on either side thereof, the lateral extension of said widened portion on one side of the elongate opening being larger than that on the other side, and the two end portions of said movable clamping member situated on either side of, but spaced different distances from, the screw axis are formed to engage a workpiece so that by a rotation of the said clamping member through 180° there can be provided at will an abutment portion more or less upstanding above said plate of the clamping device.

4. A clamping device in accordance with claim 1, wherein the extreme edge of the widened portion remote from the middle portion of the opening is spaced from that end surface of the adjacent one of said bearings which faces the middle portion of said screw member, the distance from the center of said screw member to the underside of said plate of the clamping device is at least equal to the distance from the center of said screw member to that side face of said movable clamping member which faces upwardly in the recumbent position of said clamping member, and by further rotation of said screw member to lock said clamping member in recumbent position, said clamping member adapted to be at least partly moved in under that portion of said clamping device plate which is situated between said extreme edge of the widened portion and said end surface of said bearing.

References Cited

UNITED STATES PATENTS

| | | | |
|---|---|---|---|
| 990,186 | 4/1911 | Berg | 269—285 X |
| 1,151,959 | 8/1915 | McKenzie | 269—244 X |
| 1,407,743 | 2/1922 | Franck | 144—306 |

ROBERT C. RIORDON, Primary Examiner

J. F. McKEOWN, Assistant Examiner

U.S. Cl. X.R.

269—251, 315